United States Patent
Bauer et al.

[11] Patent Number: 5,896,846
[45] Date of Patent: Apr. 27, 1999

[54] FUEL MODULE

[75] Inventors: Sascha Bauer, Auenwald; Thomas Butz, Korntal-Muenchingen; Bertram Uebelhoer, Korb, all of Germany

[73] Assignee: Filterwerk Mann & Hummel GmbH, Ludwigsburg, Germany

[21] Appl. No.: 08/785,367

[22] Filed: Jan. 17, 1997

[30] Foreign Application Priority Data

Jan. 20, 1996 [DE] Germany .................. 196 02 082

[51] Int. Cl.$^6$ .................................................. F02M 37/04
[52] U.S. Cl. .................... 123/510; 123/514; 123/557; 123/179.11
[58] Field of Search ........................ 123/557, 510, 123/514, 516, 179.11

[56] References Cited

U.S. PATENT DOCUMENTS

| | | | |
|---|---|---|---|
| 2,599,699 | 6/1952 | Dilworth | 123/514 |
| 4,372,847 | 2/1983 | Lewis | 123/510 |
| 4,454,848 | 6/1984 | Doprez | 123/514 |
| 4,600,825 | 7/1986 | Blazejovsky | 123/557 |
| 4,844,793 | 7/1989 | Izutani | 123/557 |
| 4,933,093 | 6/1990 | Keller | 123/557 |
| 4,984,554 | 1/1991 | Ariga | 123/179.17 |
| 5,110,460 | 5/1992 | Gilas | 123/557 |
| 5,207,898 | 5/1993 | Hodgkins | 123/179.9 |
| 5,664,532 | 9/1997 | August | 123/179.11 |

FOREIGN PATENT DOCUMENTS 2430636  2/1975  Germany .................. 123/514

*Primary Examiner*—Carl S. Miller
*Attorney, Agent, or Firm*—Evenson, McKeown, Edwards & Lenahan, P.L.L.C.

[57] ABSTRACT

A fuel module including a fuel filter located on a valve block 10 and having a replaceable filter insert 14 in a filter housing 11. The fuel module also has a manually-operable feed pump 31, a connection 8, located on the valve block 10, for fuel supply, a connection C for fuel return, two connections A, D for a mechanical feed pump and a connection E to the injector pump, the manually-operable feed pump 31 containing two identically-constructed valves 23, 24.

18 Claims, 3 Drawing Sheets

FUEL MODULE

BACKGROUND OF THE INVENTION

This invention relates to a fuel module, in particular for incorporation in a motor vehicle.

A fuel module of this general type is known from Tuckey, U.S. Pat. No. 5,415,146 (=DE 4,443,621). This known module comprises an electrical fuel pump, and is disposed in a container for a fuel tank of a vehicle. A filter at the base of the fuel tank has an outlet which is connected to the main pump inlet, so that the pump can draw fuel directly out of the fuel tank. A further fuel outlet in the container connected to the pump inlet is controlled by a valve which opens the second fuel outlet when the main pump outlet runs dry due to lack of fuel in the fuel tank. A filter member above the second fuel outlet filters fuel flowing from the container to the pump inlet when the valve is open. A disadvantage of this arrangement is that the filter member can only be replaced after the fuel tank has been opened. This involves considerable expenditure of time and effort for disassembly and reassembly.

In addition, it is necessary with a fuel module to provide a manual pump. This manual pump has the purpose of supplying fuel to the fuel system, after the latter has been totally emptied, until the mechanical fuel pump is again capable of functioning.

A fuel filter element is known from Brun, published European Patent Application No. EP 664,391. This filter element is connected to a simple manual pump. A disadvantage of this system, however, is that the pump is sensitive to external influences, and that there is a risk that it can be damaged.

SUMMARY OF THE INVENTION

The object of the invention is to provide a fuel module which has a compact structure.

This and other objects are achieved in accordance with the present invention by providing a fuel module comprising a fuel filter mounted on a valve block, said fuel filter comprising a filter housing containing a replaceable filter insert, said valve block comprising a fuel supply connection, a fuel return connection, a first feed pump connection, a second feed pump connection, and an injector pump connection.

The fuel module of the invention has the advantage that a valve block is provided which contains all the feed and return connections, and in addition supports the filter element.

In accordance with one embodiment of the invention, a manual feed pump is incorporated into the device. This feed pump essentially comprises two identically-constructed valves, and is thus extremely cost-effective to manufacture.

According to a further embodiment of the invention, a heating element is provided in the vicinity of the filter. This heating element may comprise, for example, a resistance element embedded in the plastic (i.e., synthetic resin) material from which the housing and/or the housing cover are formed. The embedded resistance element, in conjunction with a positive temperature coefficient (PTC) resistor, heats the fuel when the temperature falls below a predetermined threshold level. The heating element can be integrated both in the housing and in the cover of the filter. If the heating element is integrated in the cover, electrical contact is provided via an appropriate plug connector, or via contact members between the cover and the housing.

A vent bore advantageously may be provided in the support member for the filter casing in order to remove air bubbles. This vent bore is disposed in the upper, unfiltered fluid area and causes continuous backflow of a specific quantity of fuel to the fuel supply tank. In this case air bubbles or air accumulating in the upper region of the filter casing are returned to the fuel supply tank.

According to an advantageous further embodiment of the invention, a pre-filter is arranged in the valve block in order to trap coarse impurities. This pre-filter element is simple to replace when required.

According to another embodiment of the invention, the filter insert is a non-metallic insert, e.g. it comprises a zig-zag folded filter paper or filter element sealed on its end faces with thermoplastic end discs. Such a filter element is simple to dispose of.

According to another embodiment, the filter element is provided with a dirt-collecting chamber or space. This construction has the advantage that, when the filter is replaced, dirt adhering to the circumference of the element does not pass into the filter housing, but instead is removed with the filter insert. This dirt-collecting space preferably is in the form of a substantially cup-shaped shell of filter material around the filter insert.

The fuel returned by the injection pump, which has been partly heated and which flows through the valve block, can be used to equalize the temperature of the valve block and of the filter element in an advantageous manner.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
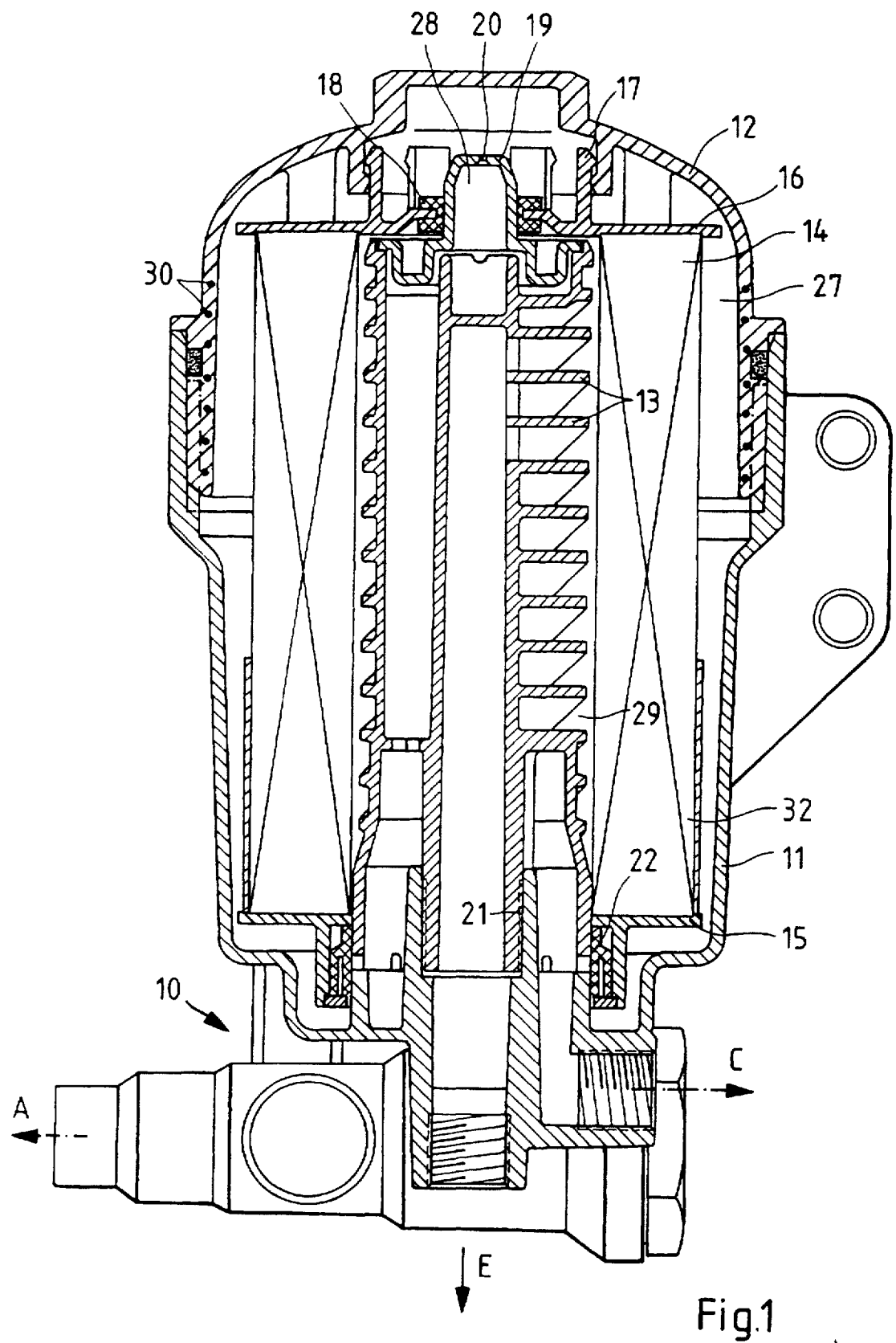
FIG. 1 shows a cross-sectional view of a fuel module according to the invention.

The cross-sectional view in FIG. 1 shows a valve block 10 having the connections for feeding and discharging fuel. A filter housing 11 is mounted on valve block 10. The filter housing 11 is closed by a removable cover 12. Cover 12 may be attached by threads or friction fit. If desired a separate seal member may be provided between the cover 12 and the housing 11. Within the housing is a support member 13, which carries a concentrically-formed filter insert 14. The filter insert 14 comprises a cylinder of zig-zag folded filter paper or filter fleece with plastic end discs 15, 16 on its end faces. The upper end disc is resiliently attached to the housing cover 12 by a snap-in member 17. The upper end disc also carries a radial seal 18 which engages a closure cap 19 of the support member 13. The closure cap 19 is provided at the top with a vent bore 20. The support member 13 is connected to the valve block 10 by a threaded connection 21. The filter insert 14 is sealed at the bottom to the support member 13 by an inserted molded seal 22.

Figure 2:
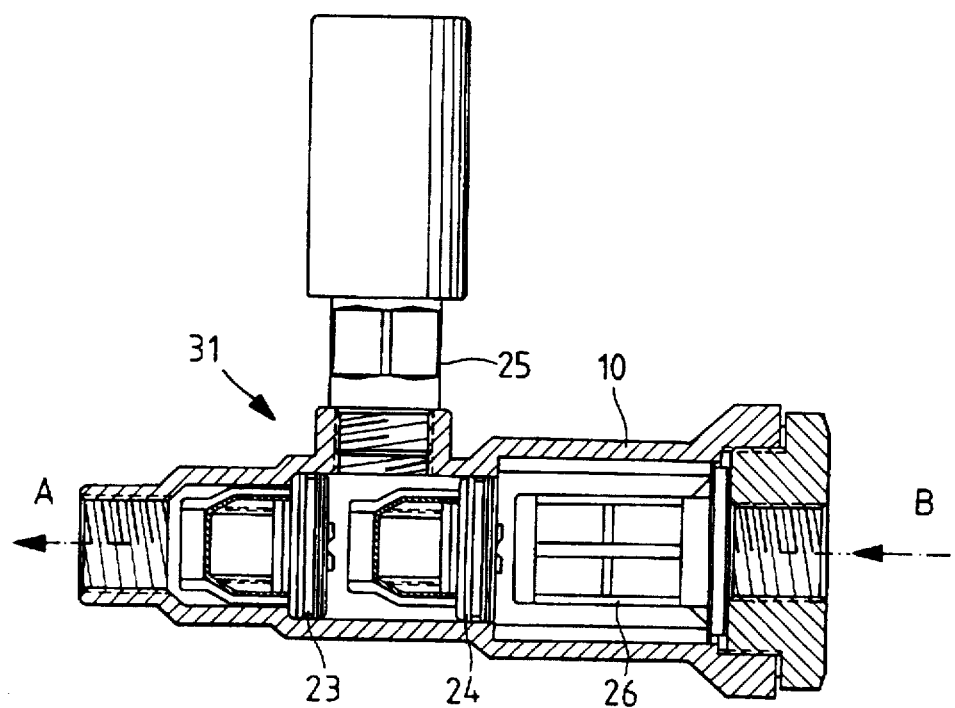
FIG. 2 shows a cross-sectional view of the manual feed pump for the fuel module according to the invention.

FIG. 2 shows the manual air-ejection/fuel-feed pump which is arranged in the valve block 10. This pump comprises two valves 23, 24 incorporated one behind the other. In order to generate intake pressure, a manually-operated piston 25 is provided in the valve intermediate space. Located in front of the pump is a pre-filter 26, which for example comprises a simple screen filter with wire mesh or gauze.

Figure 3:
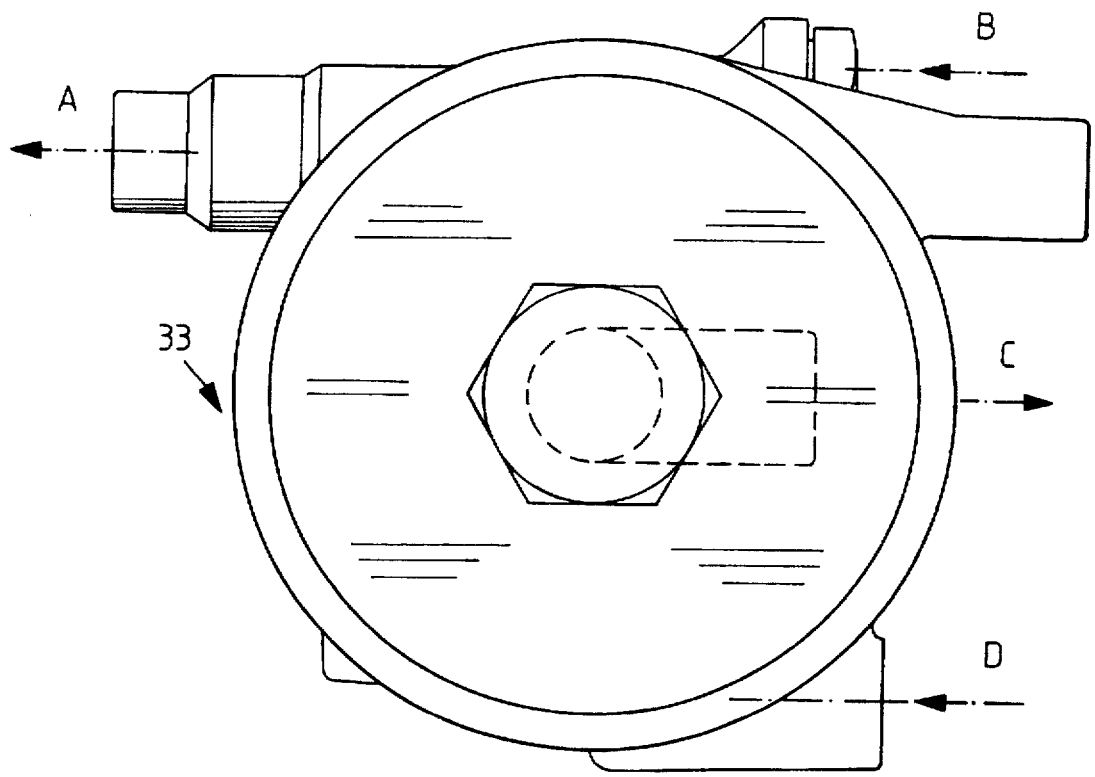
FIG. 3 is a plan view of the fuel module of the invention.

FIG. 3 shows the individual connections in a plan view of the fuel module. In the illustrated embodiment the connection A is for fuel supply to the main feed pump, connection B for fuel feed from the tank, connection C for the tank return, and connection D for feed of fuel from the main feed pump. Connection E on the valve block can be seen in FIG. 1. Connection E serves to convey the filtered fuel to the injector pump. At connection B, as FIG. 2 shows, the fuel is brought from the tank. If the system is empty, fuel must be drawn in by the manually operated air-ejection/fuel-feed pump shown in FIG. 2. This fuel, in a pre-filtered state, then passes through connection A to the main feed pump and from this point back through connection D into the filter system, where it enters the unfiltered fluid area 27 located outside the filter insert 14. If air bubbles have formed in the fuel, or an air-lock has formed at the top of the filter housing, this air is passed through the ventilation bore 20 into the return area 28 of the support member 13, and from there passes out through connection C back to the fuel tank. The fuel flows from the unfiltered fluid area 27 inwardly through the filter insert 14 into the filtered fluid area 29, from whence it is discharged downwards to connection E. At this point the fuel can be made available to the injector pump.

A heating system in the form of an electrical resistance heater can be located in the cover 12 and/or in the filter housing 11 in order to heat the fuel. The heating system may, for example, comprise electrical heating wires 30 embedded in the plastic material of the cover 12. Current is supplied to these heating wires via a conventional power supply and connector not shown here.

The manual air-ejection/fuel-feed pump is constructed in a simple manner by piston 25 and two identical valves 23, 24, which are simply press fit into the openings in the valve block 10. Thus, a particularly cost-effective construction is achieved for this manual pump.

Figure 4:
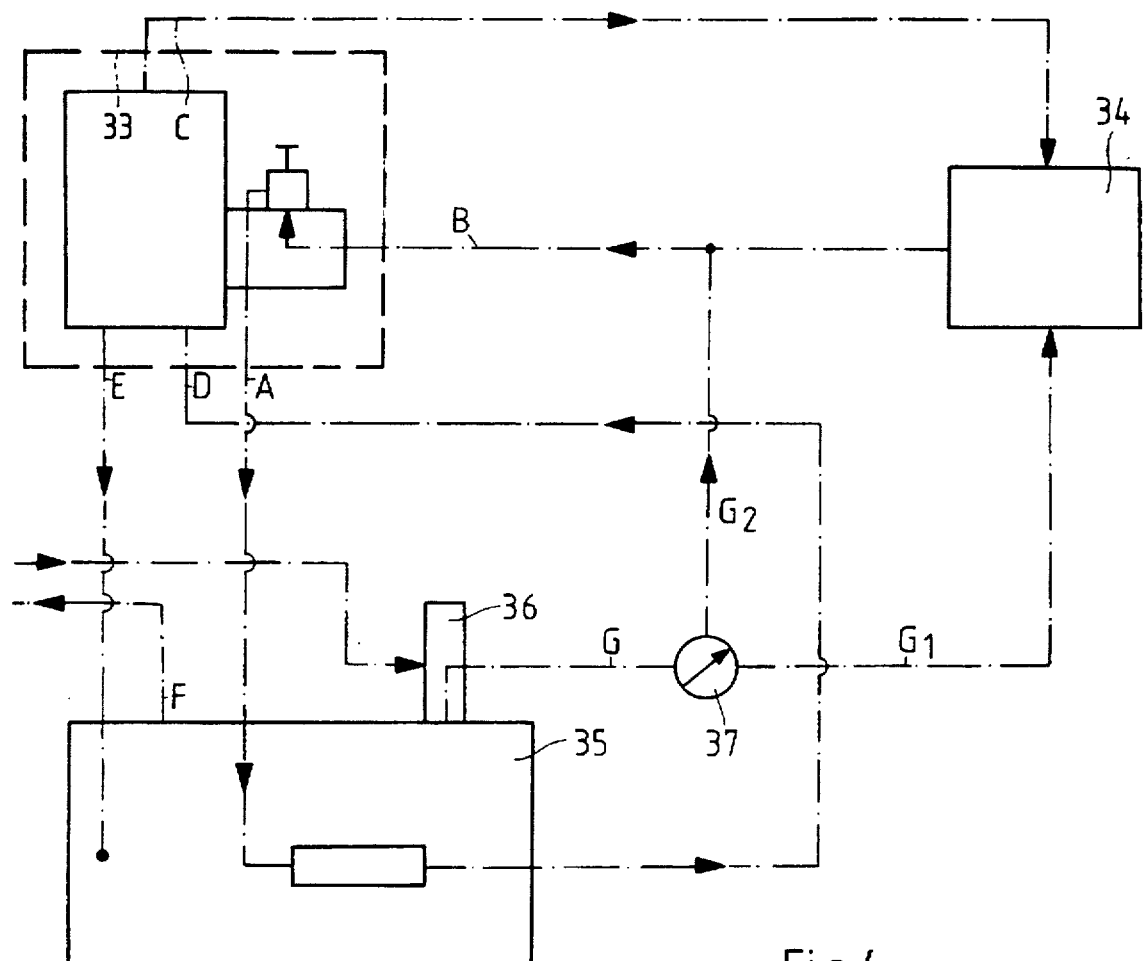
FIG. 4 is a fuel-flow diagram for the fuel module of the invention.

FIG. 4 shows a fuel-flow diagram including the fuel module 33, which comprises the components shown in FIG. 1. Connection B is connected to the fuel tank 34. Return flow to the tank is provided through connection C. Connection E communicates with the injector pump 35. The main feed pump, to which fuel is passed through connection A, is flanged onto the injector pump 35. This main feed pump conveys the supplied fuel to connection D. The pressure line F, which conveys the fuel to the engine, is shown coming off from the injector pump 35. Fuel flowing back from the engine passes though the overflow valve 36 back through line G into the fuel tank.

As an alternative to heating the fuel by means of a heating system, the increase in temperature of the fuel returned by the injector pump 35 through line G can be utilized to heat the fuel module. For this purpose a thermostatic valve 37 is provided in line G. Below a specific ambient temperature, this valve 37 diverts the returning fuel into line G2 and thus to connection B. If the ambient temperature is above a determined threshold temperature, the thermostatic valve switches back and causes fuel diverted from the overflow valve 36 to be fed back to fuel tank 34.

Figure 5:
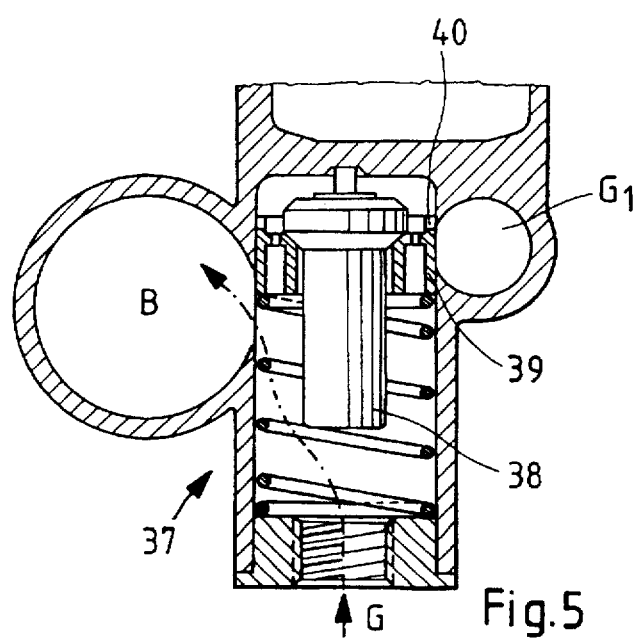
FIG. 5 is a drawing of a thermostatic valve for the fuel module of the invention.

Thermostatic valve 37 is illustrated in greater detail in FIG. 5. The fuel passes through a fuel feed G, in the position shown in the drawing, to the line B, i.e. to connection B for fuel supply. Since the fuel coming from the injector pump has absorbed engine heat, this engine heat can be utilized to pre-heat the fuel filter. As soon as the temperature of the fuel or of the environment exceeds a threshold temperature, an expansion (wax) thermostat 38 moves downwards and closes the left-hand opening to connection B, and simultaneously opens the right-hand opening G1 which leads to the fuel tank 34. In order that excess pressure does not arise at connection B in the position shown in FIG. 5, a bypass opening 40 is provided in the valve body 39 of the expansion thermostat 38. In every position of the valve body 39 a small quantity of fuel can pass through this bypass opening 40 to the line G1.

The manually-operated air-ejection/fuel feed pump 31 may be omitted from the fuel module, if an electrically operated main feed pump is provided. An electrically operated main feed pump is normally located at the fuel tank, so that manual ejection of air from the lines is not necessary.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel module comprising:
    a fuel filter having a filter housing containing a replaceable filter insert and including a support member for the filter insert, said support member being provided with a vent bore, and
    a valve block comprising a fuel supply connection, a fuel return connection with which said vent bore communicates, a first feed pump connection, a second feed pump connection, and an injector pump connection,
    said filter insert comprising a non-metallic filter element and a pair of end disks at respective opposite ends of the filter element, said end disks being made of thermoplastic synthetic resin material.

2. A fuel module according to claim 1, further comprising a manually operable air-ejection/fuel-feed pump which comprises two valves.

3. A fuel module according to claim 2, wherein the two valves are identical in construction.

4. A fuel module according to claim 1, wherein said fuel filter further comprises a heating element.

5. A fuel module according to claim 4, wherein said filter housing is provided with a removable housing cover, and said heating element is arranged in the housing cover.

6. A fuel module according to claim 4, wherein said filter housing is provided with a removable housing cover, at least one of said filter housing and said housing cover being composed of a thermoplastic synthetic resin material, and the heating element comprising an electrical resistance element embedded in at least one of the filter housing and the housing cover.

7. A fuel module according to claim 1, further comprising a pre-filter arranged in the valve block downstream of said fuel supply connection.

8. A fuel module according to claim 1, wherein said filter insert is provided with a dirt-collecting space at a lower end of the insert.

9. A fuel module according to claim 1, further comprising a fuel return line which conducts heated fuel to the fuel supply connection.

10. A fuel module according to claim 1, further comprising an electrically-operated feed pump communicating with the fuel supply connection of the valve block.

11. A fuel module according to claim 1, further comprising an injector pump and a fuel return for returning fuel from the injector pump to the valve block, whereby fuel entering the valve block through the fuel supply connection is heated by fuel returned by the injector pump.

12. A fuel module comprising:

a fuel filter having a filter housing containing a replaceable filter insert, and a valve block comprising a fuel supply connection through which unfiltered fuel is fed to the valve block from a fuel tank, a fuel return connection providing return flow of air and prefiltered excess fuel from said valve block to the fuel tank, a first feed pump connection through which prefiltered fuel is fed from said valve block to a feed pump, a second feed pump connection through which prefiltered fuel is fed to said valve block from the feed pump, and an injector pump connection through which filtered fuel is conveyed from said valve block for engine injection.

13. A fuel module according to claim 12, further comprising a manually operable air-ejection/fuel-feed pump which comprises two valves.

14. A fuel module according to claim 13, wherein the two valves are identical in construction.

15. A fuel module according to claim 12, wherein said fuel filter further comprises a heating element.

16. A fuel module according to claim 15, wherein said filter housing is provided with a removable housing cover, and said heating element is arranged in the housing cover.

17. A fuel module according to claim 12, further comprising a fuel return line which conducts heated fuel to the fuel supply connection.

18. A fuel module according to claim 12, further comprising an injector pump and a fuel return for returning fuel from the injector pump to the valve block, fuel entering the valve block through the fuel supply connection being heated by fuel returned by the injector pump.

* * * * *